United States Patent
Hiltz-Laforge et al.

(10) Patent No.: US 8,645,387 B2
(45) Date of Patent: Feb. 4, 2014

(54) EXPERTISE IDENTIFICATION USING INTERACTION METRICS

(75) Inventors: Jason Hiltz-Laforge, Ottawa (CA); Alireza Pourshahid, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 13/183,331

(22) Filed: Jul. 14, 2011

(65) Prior Publication Data

US 2012/0117070 A1    May 10, 2012

(30) Foreign Application Priority Data

Nov. 5, 2010  (CA) ................................. 2719790

(51) Int. Cl.
*G06F 7/00* (2006.01)
*G06F 17/30* (2006.01)

(52) U.S. Cl.
CPC .................. *G06F 17/30699* (2013.01)
USPC ....................................................... 707/740

(58) Field of Classification Search
None
See application file for complete search history.

(56) References Cited

U.S. PATENT DOCUMENTS

| | | | |
|---|---|---|---|
| 6,513,013 B1 | 1/2003 | Stephanou | |
| 6,829,585 B1 | 12/2004 | Grewal et al. | |
| 7,353,467 B2 | 4/2008 | Robertson et al. | |
| 7,698,270 B2 | 4/2010 | Brave et al. | |
| 7,792,786 B2 | 9/2010 | Chen et al. | |
| 2001/0032244 A1 | 10/2001 | Neustel | |
| 2003/0216938 A1* | 11/2003 | Shour | 705/2 |
| 2006/0031109 A1* | 2/2006 | LaRue et al. | 705/9 |
| 2008/0010384 A1* | 1/2008 | Rechterman et al. | 709/238 |
| 2009/0112704 A1* | 4/2009 | Branca | 705/11 |
| 2009/0182647 A1* | 7/2009 | Sundaresan | 705/27 |
| 2009/0319521 A1* | 12/2009 | Groeneveld et al. | 707/6 |
| 2010/0088331 A1 | 4/2010 | White et al. | |
| 2010/0169233 A1 | 7/2010 | Forbes et al. | |
| 2010/0185630 A1 | 7/2010 | Cheng et al. | |
| 2011/0153612 A1* | 6/2011 | Paul et al. | 707/740 |

FOREIGN PATENT DOCUMENTS

WO    2010025572 A1    3/2010

OTHER PUBLICATIONS

Oracle and Tacit Software, www.oracle.com/us/tacitsoftware/index. html, dated May 24, 2011 (1 page).

Mark T. Maybury, "Knowledge on Demand: Knowledge and Expert Discovery," Journal of Universal Computer Science, vol. 8, Issue 5, (11 pages) http://www.jucs.org/jucs_8_5/knowledge_on_demand_knowledge/Maybury_M_T.html, last printed Sep. 23, 2010.

Xiaodan Song et al., "ExpertiseNet: Relational and Evolutionary Expert Modeling," Computer Science, 2005, vol. 3528/2005, 150, DOI: 10.1007/11527886_14 (10 pages).

(Continued)

*Primary Examiner* — Jay Morrison
(74) *Attorney, Agent, or Firm* — Shumaker & Sieffert, P.A.

(57) ABSTRACT

An illustrative embodiment of a computer-implemented method to identify expertise using interaction metrics receives a user identity to form an identified user, receives usage information associated with the identified user to form received information and identifies usage patterns in the received information to form identified usage patterns. The computer-implemented method further applies assessment factors to the identified usage patterns and received information, calculates a ranking for the identified user to form a calculated ranking and assigns the calculated ranking to the identified user.

19 Claims, 5 Drawing Sheets

(56) References Cited

OTHER PUBLICATIONS

Dawit Yimam Seid, Alfred Kobsa, "Expert Finding Systems for Organizations: Problem and Domain Analysis and the DEMOIR Approach," Department of Information and Computer Science, University of California (23 pages) (2003).

Dawit Yimam, Expert Finding Systems for Organizations: Domain Analysis and the Demoir Approach, German National Research Center for Information Technology, FIT.MMK (18 pages) (1999).

Autonomy, Collaboration and Expertise Networks (CEN), http://www.autonomy.com/content/Functionality/idol-functionality-collaboration-and-expertise-networks/index.en.html (13 pages) last printed Sep. 23, 2010.

Mark Maybury et al., "Awareness of Organizational Expertise," Journal of Human Computer Interaction: Special Issue on "Awareness" (12 pages) Oct. 2000.

* cited by examiner

EXPERTISE IDENTIFICATION USING INTERACTION METRICS

TECHNICAL FIELD

This disclosure relates to help systems in a data processing system and more specifically to identification of expertise using interaction metrics in the data processing system.

BACKGROUND

In a software system where users have different levels of expertise, locating assistance and collaboration partners when a concern arises is typically difficult. A typical help system, written as static pages in a manual, provides information about the software and operation of the software, but offers no details as to the application of the software to the a chosen domain of the user. Trying to find an expert/collaborator in both the software and the domain specific data can be frustrating.

SUMMARY

According to one embodiment, a computer-implemented method to identify expertise using interaction metrics receives an identity to form an identified user, receives usage information associated with the identified user to form received information and identifies usage patterns in the received information to form identified usage patterns. The computer-implemented method further applies assessment factors to the identified usage patterns and received information, calculates a ranking for the identified user to form a calculated ranking and assigns the calculated ranking to the identified user.

According to another embodiment, a computer program product to identify expertise using interaction metrics comprises a computer-readable medium containing computer executable program code stored thereon. The computer executable program code comprises computer executable program code to receive a user identity to form an identified user, computer executable program code to receive usage information associated with the identified user to form received information, computer executable program code to identify usage patterns in the received information to form identified usage patterns, computer executable program code to apply assessment factors to the identified usage patterns and received information, computer executable program code to calculate a ranking for the identified user to form a calculated ranking and computer executable program code to assign the calculated ranking to the identified user.

According to another embodiment, an apparatus for apparatus to identify expertise using interaction metrics comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to receive a user identity to form an identified user, receive usage information associated with the identified user to form received information, identify usage patterns in the received information to form identified usage patterns, apply assessment factors to the identified usage patterns and received information, calculate a ranking for the identified user to form a calculated ranking and assign the calculated ranking to the identified user.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
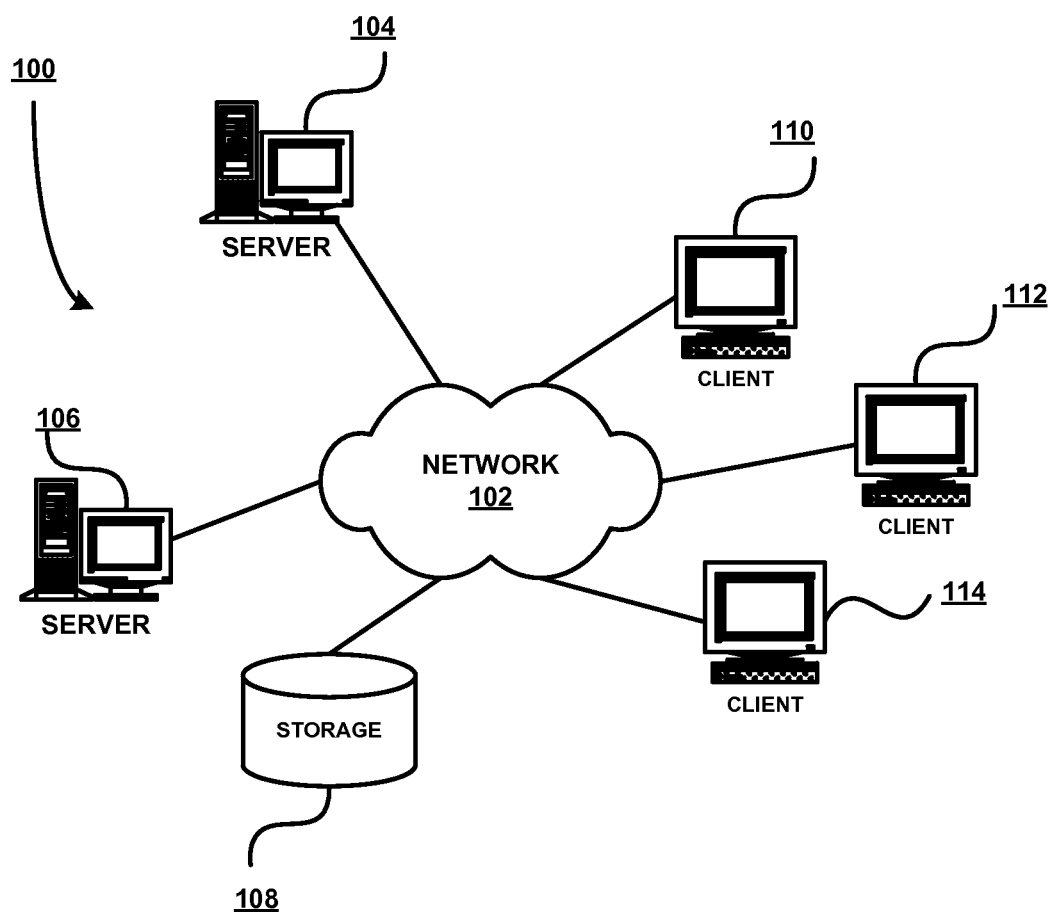
FIG. 1 is a block diagram of an exemplary data processing system network operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented method such that the instructions which execute on the computer or other programmable apparatus provide processes for implementing the functions/acts specified in the flowchart and/or block diagram block or blocks.

Figure 2:
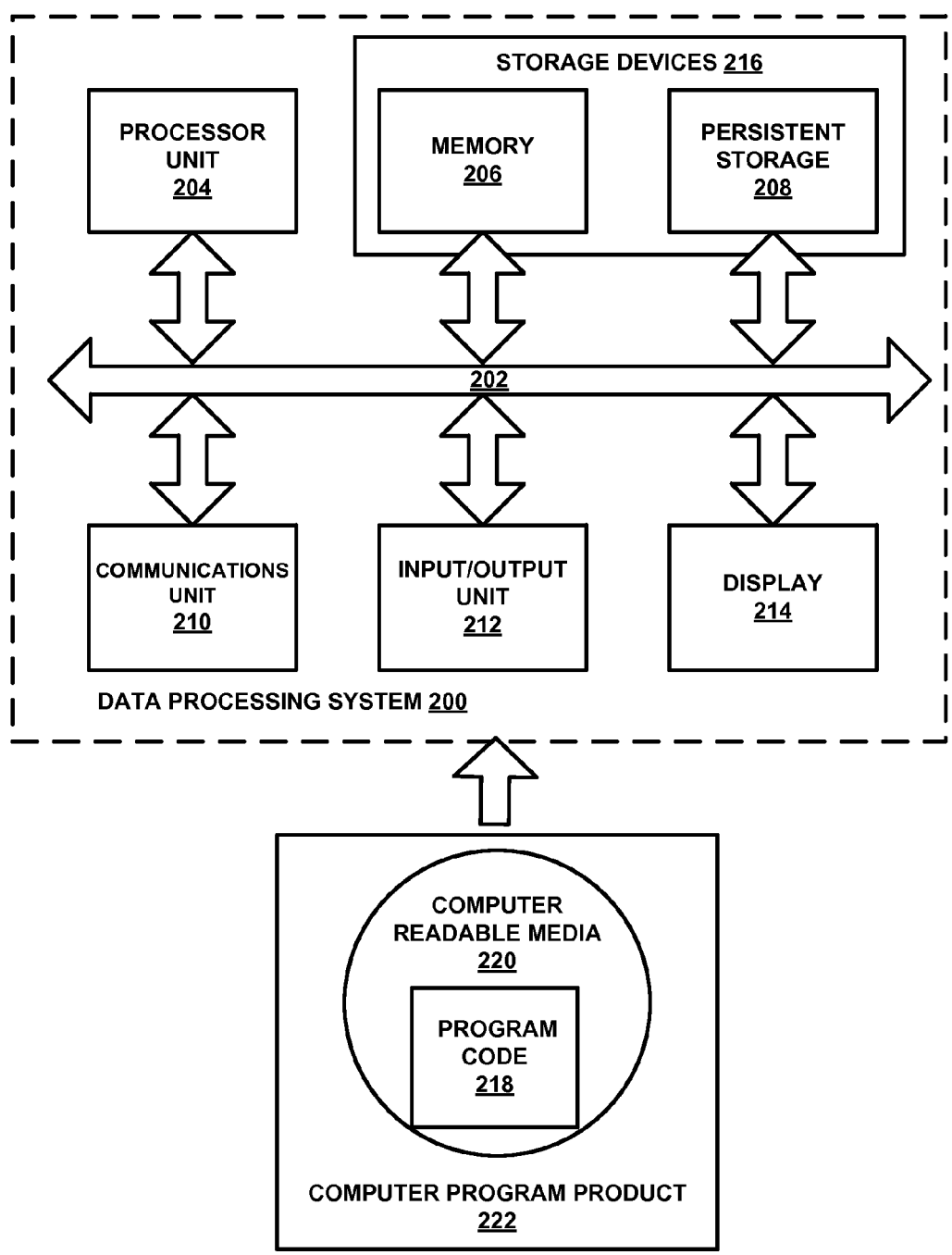
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

Some currently available help systems have devised ways of identifying experts by assigning ownership or responsibility to certain data. The experts typically fill out a profile and expertise of the expert is matched with certain artifacts in the system. A system of information is typically formed comprising documents, which contain descriptions of the expertise of a set of people. The system described relies on static expert content to convert the content into an active forum used for collaborations. A problem with such systems is that the information has to be maintained and updated frequently. As usage of the system shifts and expertise of the users and experts change, the information quickly becomes outdated. Such systems can be very hard to maintain in agile environments of today in which people shift roles and projects very often.

Typical software applications of today provide static (or nearly static) context sensitive help plus searchable help. Also a trend today is to create a user interface as simple and easy to understand as possible to minimize a need for users to rely on online help. Another current technique uses a method of real-time help with self-identified experts over the Internet. Another technique constructs domain expertise via interactions with a web browser using interactions, which are specific to a web browser. The disclosed technique relies on browser interactions.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented method for identification of expertise using interaction metrics is presented. Processor unit 204 receives a user identity through communications unit 210, input/output unit 212, or storage devices 216 to form an identified user, receives usage information associated with the identified user from storage devices 216 to form received information and identifies usage patterns in the received information to form identified usage patterns. Processor unit 204 further applies assessment factors to the identified usage patterns and received information, calculates a ranking for the identified user to form a calculated ranking and assigns the calculated ranking to the identified user.

In another example, a computer-implemented method, using program code 218 stored in memory 206 or as a computer program product 222, for identification of expertise using interaction metrics comprises a computer recordable storage media, such as computer readable media 220, containing computer executable program code stored thereon. The computer executable program code comprises computer executable program code for identification of expertise using interaction metrics.

In another illustrative embodiment, the method for identification of expertise using interaction metrics may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the method for identification of expertise using interaction metrics.

Figure 3:
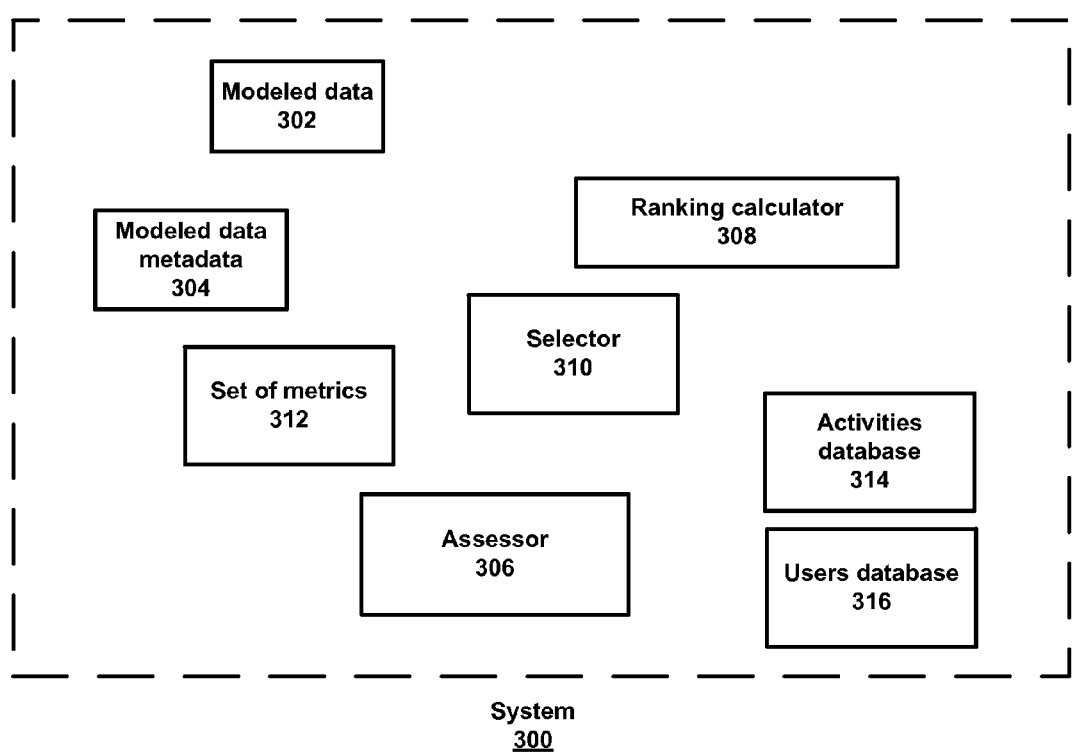
FIG. 3 is a block diagram of an expertise identification system, in accordance with one embodiment of the disclosure.

With reference to FIG. 3 a block diagram of an expertise identification system, in accordance with one embodiment of the disclosure is presented. Expertise identification system 300 is an example of a combination of components supported by a data processing system such as system 200 of FIG. 2 for identifying an expert with which to communicate and collaborate.

Expertise identification system 300 performs identification of an expert using interaction metrics including actions, roles, metadata and time. Current alternatives of typical software applications of today provide static (or nearly static) context sensitive help plus searchable help. Expertise identification system 300 constructs an expertise profile dynamically that changes based on interactions with the system, rather than relying on static documents or descriptions.

Illustrative embodiments of expertise identification system 300 are limited to identifying an expert through mechanisms described and then using existing and future communication and collaboration tools (including email, instant messaging, telephone, and chat) to facilitate a discussion. Illustrative embodiments are not intended to describe any new form of collaboration or communication tool but rather to demonstrate a novel mechanism of discovering or identifying an expert with which to communicate and collaborate.

When dealing with a software system, which manipulates structured information, the system and people managing the data in that system produce a certain amount of metadata. By keeping track of roles of respective users, interactions and actions performed, and the metadata upon which the actions are performed, the system can learn domain expertise of users and present the users as experts to anyone requesting assistance with a particular metadata area having a similar role and performs similar actions/interactions on a report.

The advantages to such a system are typically significant. The users typically receive much more relevant help, in the form of people within an organization who are both domain experts and users of the software. The system adapts as usage patterns change, eliminating a need for manual identification and maintenance of expertise profiles. A history of respective interactions of users is maintained enabling experts and collaborators to be identified at any point in time. Importance of certain actions can be weighted and adjusted using domain information and data rather than relying on generic answers from a static help system.

In one illustrative embodiment, expertise identification system 300 comprises a number of components including modeled data 302, modeled data metadata 304, assessor 306, ranking calculator 308, selector 310, set of metrics 312, activities database 312, users database 316.

Modeled data 302 represents data upon which an operation is performed. The operation on the data represents an interaction with the system. Modeled data 302 is a form of structured data. Unstructured data may also be used provided information describing the unstructured in sufficient detail is available for processing (as an alternative to the combination of structured data and associated metadata). From the previous examples, modeled data 302 may be sales data for an offering (product or service).

Assessor 306 provides a capability to assess an interaction. Interactions are monitored by expertise identification system 300 and assessed according to factors of assessment defined as set of metrics 312, which also includes weighting factors for respective metrics within the set of metrics represented by set of metrics 312. Assessing an interaction enables categorizing an interaction into one of the defined metrics in set of metrics 312.

Ranking calculator 308 provides a capability to derive a numerical value based on using an algorithm from a set of predefined algorithms for a combination of metrics associated with a set of interactions for a user. Each predefined algorithm provides a capability to process a specific set of metadata and is selected programmatically in accordance with the metadata. The predefined algorithms may be referred to as data driven.

Ranking calculator 308 also uses weighting factors provided by set of metrics 312 in performance of calculations as needed. Applying weighting factors provides a dynamic adjusting mechanism for metrics associated with a set of interactions. A rank resulting from a ranking calculation is assigned to a specific user associated with a set of interactions.

Selector 310 provides a capability to select a user using a previously assigned rank. Selection may be performed according to typical ordering criteria. For example, a specific match, a range of values, a negative (not less than) specifications may be used to identify a candidate user.

Set of metrics 312 represents a predefined set of operations or interactions for which statistical information is desired and upon which ranking of expertise is determined. In a previous example, set of metrics 312 comprises metrics including actions, roles, metadata and time. Set of metrics 312 also provides a capability to monitor and gather usage statistics for each interaction of a user.

Activities database 314 is a data structure in a memory containing a set of interactions and associated data values gathered by expertise identification system 300 for selective processing to identify a candidate user according to a set of usage criteria used to established identifiable usage patterns.

Users database 316 is a data structure in a memory containing a set of user identifiers and associated rankings from which candidate users may be selected for presentation to a requester. For example, users database 316 contains information identifying a user, ranking value for a set of interactions, where the set comprises one or more interactions and contact information to enable a requester to contact a selected user. A ranking value assigned to a user in users database 316 is representative of an intersection of knowledge in tool (application) usage and knowledge in (application) data usage. Activities database 314 in combination with users database 316 forms an expert history knowledge base.

Figure 4:
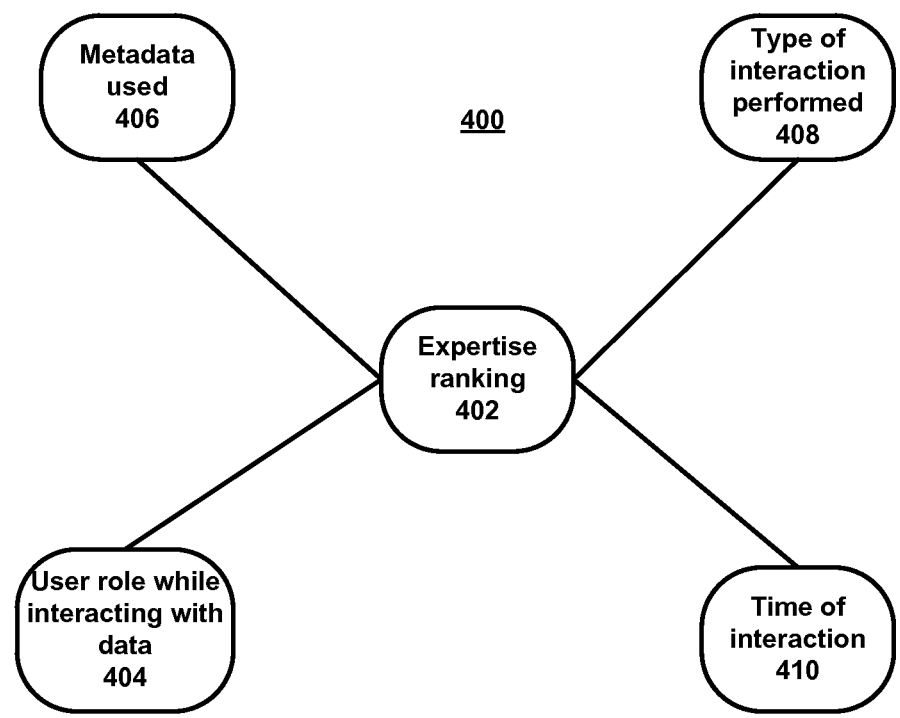
FIG. 4 is a block diagram of a set of metrics used with the expertise identification system of FIG. 3, in accordance with one embodiment of the disclosure.

With reference to FIG. 4 a block diagram of a set of metrics used with the expertise identification system of FIG. 3, in accordance with one embodiment of the disclosure is presented. Set of metrics 400 is an example of a set of metrics used to calculate expertise-ranking 402 using expertise identification system 300 of FIG. 3.

Expertise identification uses four dimensions including user role while interacting with data, role 404, metadata used 406, type of interaction performed, action 408, and time of interaction 410. The system relies on the four metrics to identify and rank expertise and find a best matching expert/collaborator for a particular user.

A user role, while interacting with data, is tracked as role 404. The role is a definition of a user position at a time an interaction is recorded by expertise identification system 300 of FIG. 3. For example, when a user is creating as report as an author the role assigned and tracked would be that of author. The role categorization enables filtering of users by specific roles during subsequent use of the system.

Metadata used 406 describes the data used in the interactions of the system. For example, sales data may have further information as metadata describing sales by region, by salesperson, timing of sales including when the sale occurred, duration to close a sale and other information.

Type of interaction performed, action 408, defines an activity associated with the interaction. For example, when authoring a report, a type of action would be referred to as an author, create or build type of activity. For an existing report, types of interaction may include viewing, updating, deleting, or other more fine grained activities including changing particular fields within a report, linking data to a report function (defining data used).

Time of interaction 410 refers to a timestamp of an operation activity or interaction by a user working with an application and associated data. For example, a user editing a document causes a set of operational interactions to occur including time the document was opened, time an edit session was initiated (and a corresponding time editing was stopped) as well as fine grained interactions such as using a feature of a word processor such as change tracking Using the example of change tacking, what was changed in a particular document is not of interest. Interactions of interest with respect to change tracking may include metrics associated with a number (count) of changes, largest change, smallest change average size of change, change within a change, type of change (add, delete, modify), embedded objects, linked objects and other typical operational aspects.

Figure 5:
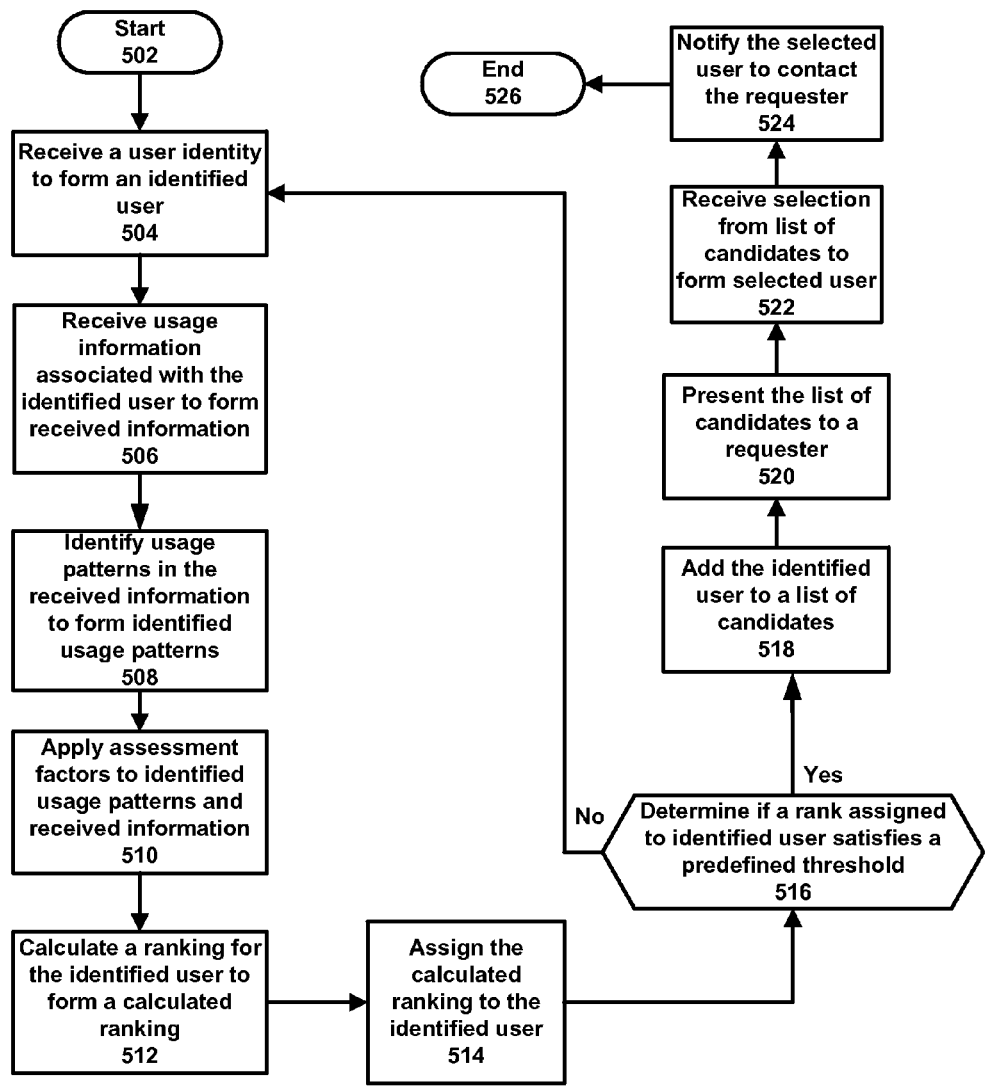
FIG. 5 is a flowchart of a method for expertise identification using the expertise identification system of FIG. 3, in accordance with one embodiment of the disclosure.

With reference to FIG. 5 a flowchart of a method for expertise identification using the expertise identification system of FIG. 3, in accordance with one embodiment of the disclosure is presented. Method 500 is an example of a method using expertise identification system 300 of FIG. 3.

Method 500 begins (element 502) and receives a user identity to form an identified user (element 504). Method 500 receives usage information associated with the identified user to form received information (element 506). The usage information represents data and metadata associated with interactions being monitored by the expertise identification system for each identified user.

Method 500 identifies usage patterns in the received information to form identified usage patterns (element 508). Method 500 applies assessment factors to the identified usage patterns and received information (element 510). Applying assessment factors represents categorizing the received information according to a predefined set of metrics. The predefined set of metrics may also have an associated weight for one or more respective metric in the set of metrics.

Method 500 calculates a ranking for the identified user to form a calculated ranking (element 512). Calculation of a rank is performed for the identified user using a predefined algorithm as determined by the received information. When the calculation uses an associated weight for one or more respective metric in the set of metrics the calculation forms an adjusted rank. Method 500 having calculated a ranking assigns the calculated ranking to the identified user (element 514).

Method 500 determines whether a rank assigned to the identified user satisfies a predefined threshold (element 516). Responsive to a determination that the rank assigned to the identified user does not satisfy a predefined threshold, method 500 loops back to perform element 504 as before. Responsive to a determination that the rank assigned to the identified user does satisfy a predefined threshold, method 500 adds the identified user to a list of candidates (element 518).

Method 500 presents the list of candidates to a requester (element 520). The requester is a user seeking assistance with an interaction. The list of candidates is a set of identified users deemed to be capable of assisting with the specific interaction activity of the requester. The list of candidates may also be referred to as a list of experts. The list of candidates may be provided as an ordered list according to rank or where a group of candidates has a same rank as an unordered list.

Method 500 receives a selection from the list of candidates to form a selected user (element 522). Method 500 notifies the selected user to contact the requester (element 514) and terminates thereafter (element 516). In an alternative embodiment, the requester may be presented with contact information of the selected user enabling the requester to make contact.

In an illustrative example a software system, implements the disclosed expertise identification system 300 of FIG. 3, containing modeled data. Certain users using the modeled data author reports. The complexity of the authoring actions varies greatly, and many users in the system have no authoring ability at all, relying solely on report consumption to accomplish respective tasks.

The models categorize data based on dimensions; for example, one particular model may hold information regarding sales data. Typical dimensions for this data include the sales region, the salespeople, and sales amounts in different time periods, percentage of returns or refunds and time required to close each sale. Different users are interested in different information and write and consume reports, which relate to these interests.

To determine an expertise level of a user with a particular piece of metadata the system watches how often the specific user interacts with the data and determines the quality of these interactions, considering a type of interaction, a role of the user and the date/time of the interaction. For example, a first user who currently (a date/time) authors (a role/action) several reports containing performance data for various salespeople (metadata) would be a good candidate expert for report authoring on the sales people of the organization. Similarly, a second user who consumes (action/interaction) these reports frequently may well have a lower level of expertise in report authoring but a higher level of business knowledge about the domain. Therefore, when a novice report author is looking for help, a first user might be the most appropriate match. Similarly, when a business analyst is looking for help, a second user is potentially a better match.

In this manner, different interactions offered by the expertise identification system could be given an adjustable weight in determining an expertise level of a user. The expertise-weighting algorithm could also be sensitive to time, preferring experts who have most recently looked at the data rather than those users who have only done some light interactions during the latest time period.

For instance in the above example, when two users who have authored performance data for various sales people, the user with a combination of a number of reports authored and time of authoring will be used to rank the expertise of these users and identify the "better" expert. The specific algorithm used to calculate a rank is dependent on the type of metadata being manipulated as well as the intended use of the software. Core metrics include role, metadata, interaction, and time to locate and identify relevant experts. The expertise identification system performs the process programmatically by analyzing usage patterns and gathering the required metrics.

In another example, a junior-level author is defining a report. This author has good domain knowledge of the data but has limited knowledge when it comes to the software. At some point, the author knows function X must be used, but the author does not understand how to call the function properly or in using feature Y cannot obtain a desired result.

Expertise identification system 300 of FIG. 3 tracks the functions, features and tools, which are used by the users. That way, when the junior-level author is unable to solve the issue with function X, the expertise identification system can suggest the junior-level author contact another user because not only does that user frequently employ function X, the user did so successfully three times yesterday.

A scoring algorithm of the expertise identification system determines a level of expertise of the user with a certain tool or function using a number of successful uses of that tool or function, complexity of action performed, whether or not a designed report and associated functions are being used by other people, and other predefined metrics to create and maintain an expert history knowledge base to provide integrated, online help assistance for a software product. The expertise identification system uses the expert history knowledge base to locate domain experts using a specific approach of matching based on actions, roles, metadata, and time) as previously described. A domain is not limited to a business intelligence domain.

Thus is provided an illustrative embodiment of a computer-implemented method for identification of expertise using interaction metrics receives a user identity to form an identified user, receives usage information associated with the identified user to form received information and identifies usage patterns in the received information to form identified usage patterns. The illustrative embodiment of the computer-implemented method further applies assessment factors to the identified usage patterns and received information, calculates a ranking for the identified user to form a calculated ranking and assigns the calculated ranking to the identified user.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, and other software media that may be recognized by one skilled in the art.

It is important to note that while the present disclosure has been described in the context of a fully functioning data processing system, those of ordinary skill in the art will appreciate that the methods of the present disclosure are capable of being distributed in the form of a computer readable medium of instructions and a variety of forms and that the present disclosure applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present disclosure has been presented for purposes of illustration and description, and is not intended to be exhaustive or limited to the disclosure in the form disclosed. Many modifications and variations will be apparent to those of ordinary skill in the art. The embodiment was chosen and described in order to best explain the principles of the disclosure, the practical application, and to enable others of ordinary skill in the art to understand the disclosure for various embodiments with various modifications as are suited to the particular use contemplated.

What is claimed is:

1. A computer-implemented method to identify expertise using interaction metrics, the computer-implemented method comprising:
    receiving an identity to form an identified first user;
    receiving usage information that indicates an interaction of the identified first user with a system;
    determining, for the interaction of the identified first user with the system, data indicating one or more of a first user role of the identified first user, a first type of the interaction performed by the identified first user, a first activity associated with the interaction, and a first time of the interaction;

identifying at least one usage pattern in the usage information, based at least in part on the data, to form at least one identified pattern;

assigning a calculated ranking for the identified first user that is based at least in part on the at least one identified pattern;

receiving, from a second user, a request for assistance with an interaction of a system, wherein the request is based at least in part on an input of the second user associated with the system;

determining information corresponding to the second user, wherein the information comprises at least one of a second user role of the second user, metadata corresponding to data of an interaction of the second user, a second type of interaction performed by the second user, a second activity associated with the interaction of the second user, and a second time of the interaction of the second user;

weighting the calculated ranking based at least in part on the determined information corresponding to the second user; and in response to receiving the request and based at least in part on determining that the calculated ranking of the identified first user satisfies a threshold, providing a notification to at least one of the identified first user and the second user.

2. The computer-implemented method of claim 1 further comprising:

responsive to a determination that the calculated ranking assigned to the identified first user does satisfy the threshold, adding the identified first user to a list of candidates;

presenting the list of candidates to the second user;

receiving a selection from the list of candidates to select the first user; and notifying the identified first user to contact the second user.

3. The computer-implemented method of claim 1, further comprising:

categorizing data based on dimensions wherein the categorized data further comprises metadata associated with interactions being monitored by the expertise identification system for each identified user describing the categorized data used in interactions of the system.

4. The computer-implemented method of claim 1, further comprising:

categorizing the usage information according to a predefined set of metrics wherein the predefined set of metrics has an associated weight for one or more respective metrics in the predefined set of metrics.

5. The computer-implemented method of claim 1 wherein assigning the calculated ranking for the identified first user further comprises:

calculating a rank for the identified first user using a predefined algorithm as determined by the usage information, wherein the calculation uses an associated weight for one or more respective metric in a predefined set of metrics to form an adjusted rank.

6. The computer-implemented method of claim 2 wherein the list of candidates is a set of identified users deemed to be capable of assisting with the specific interaction activity of the second user and the list of candidates is an ordered list according to rank.

7. The computer-implemented method of claim 2 wherein notifying the identified first user to contact the second user further comprises:

providing contact information for the first user; and
notifying the-second user to contact the first user.

8. The method claim 1, wherein the user role comprises a definition of the position of the identified first user at the time of the interaction of the identified first user with the system.

9. The method of claim 1, wherein assigning the calculated ranking for the identified first user is further based at least in part on one or more of a plurality of dimensions comprising the first user role, metadata corresponding to data of the interaction, the first type of interaction performed by the identified first user, the first activity associated with the interaction, and the first time of the interaction.

10. A computer program product to identify expertise using interaction metrics, the computer program product comprising:

a computer-readable storage containing computer executable program code stored thereon, the computer executable program code comprising:

computer executable program code to receive an identity to form an identified first user;

computer executable program code to receive usage information associated with the identified first user to form received information;

computer executable program code to determine, for the interaction of the identified first user with the system, data indicating one or more of a first user role of the identified first user, a first type of the interaction performed by the identified first user, a first activity associated with the interaction, and a first time of the interaction;

computer executable program code to identify at least one usage pattern in the usage information, based at least in part on the data, to form at least one identified pattern;

computer executable program code to assign a calculated ranking for the identified first user that is based at least in part on the at least one identified pattern;

computer executable program code to receive, from a second user, a request for assistance with an interaction of a system, wherein the request is based at least in part on an input of the second user associated with the system;

computer executable program code to determine information corresponding to the second user, wherein the information comprises at least one of a second user role of the second user, metadata corresponding to data of an interaction of the second user, a second type of interaction performed by the second user, a second activity associated with the interaction of the second user, and a second time of the interaction of the second user;

computer executable program code to weight the calculated ranking based at least in part on the determined information corresponding to the second user; and computer executable program code to, in response to the receiving request and based at least in part on determining that the calculated ranking of the identified first user satisfies a threshold, provide a notification to at least one of the identified first user and the second user.

11. The computer program product of claim 10 further comprising:

computer executable program code responsive to a determination that the calculated ranking assigned to the identified first user does satisfy the threshold, to add the identified first user to a list of candidates;

computer executable program code to present the list of candidates to the second user;

computer executable program code to receive a selection from the list of candidates to select the identified first user; and computer executable program code to notify the identified first user to contact the second user.

12. The computer program product of claim 10, further comprising:

computer executable program code to categorize data based on dimensions wherein the categorized data further comprises metadata associated with interactions being monitored by the expertise identification system for each identified user describing the categorized data used in interactions of the system.

13. The computer program product of claim 10, further comprising:

computer executable program code to categorize the usage information according to a predefined set of metrics wherein the predefined set of metrics has an associated weight for one or more respective metrics in the predefined set of metrics.

14. The computer program product of claim 10 wherein computer executable program code to assign the calculated ranking for the identified first user further comprises:

computer executable program code to calculate a rank for the identified first user using a predefined algorithm as determined by the usage information, wherein the calculation uses an associated weight for one or more respective metric in a predefined set of metrics to form an adjusted rank.

15. The computer program product of claim 11 wherein the list of candidates is a set of identified users deemed to be capable of assisting with the specific interaction activity of the second user and the list of candidates is an ordered list according to rank.

16. The computer program product of claim 11 wherein computer executable program code for notifying the identified first user to contact the second user further comprises:

computer executable program code to provide contact information for the first user; and computer executable program code to notify the second user to contact the first user.

17. An apparatus to identify expertise using interaction metrics, the apparatus comprising:

a communications fabric;

a memory connected to the communications fabric, wherein the memory contains computer executable program code;

a communications unit connected to the communications fabric;

an input/output unit connected to the communications fabric;

a display connected to the communications fabric; and a processor unit connected to the communications fabric, wherein the processor unit executes the computer executable program code to direct the apparatus to:

receive an identity to form an identified first user;

receive usage information associated with the identified first user to form received information;

determine, for the interaction of the identified first user with the system, data indicating one or more of a first user role of the identified first user, a first type of the interaction performed by the identified first user, a first activity associated with the interaction, and a first time of the interaction;

identify at least one usage pattern in the usage information, based at least in part on the data, to form at least one identified usage pattern;

assign a calculated ranking for the identified first user that is based at least in part on the at least one identified pattern;

receive, from a second user, a request for assistance with an interaction of a system, wherein the request is based at least in part on an input of the second user associated with the system;

determine information corresponding to the second user, wherein the information comprises at least one of a second user role of the second user, metadata corresponding to data of an interaction of the second user, a second type of interaction performed by the second user, a second activity associated with the interaction of the second user, and a second time of the interaction of the second user;

weight the calculated ranking based at least in part on the determined information corresponding to the second user; and in response to receiving the request and based at least in part on determining that the calculated ranking of the identified first user satisfies a threshold, provide a notification to at least one of the identified first user and the second user.

18. The apparatus of claim 17 wherein the processor unit executes the computer executable program code to further direct the apparatus to:

responsive to a determination that the calculated ranking assigned to the identified first user does satisfy the threshold, add the identified first user to a list of candidates;

present the list of candidates to the second user;

receive a selection from the list of candidates to select the identified first user; and notify the identified first user to contact the second user.

19. The apparatus of claim 17 wherein the processor unit executes the computer executable program code to:

categorize data based on dimensions, wherein the categorized data further comprises metadata associated with interactions being monitored by the expertise identification system for each identified user describing the categorized data used in interactions of the system.

* * * * *